(12) United States Patent
Okunishi et al.

(10) Patent No.: US 7,079,505 B2
(45) Date of Patent: Jul. 18, 2006

(54) SATELLITE COMMUNICATION DATA DELIVERY METHOD AND SLAVE AND MASTER STATIONS USING THE METHOD

(75) Inventors: Masako Okunishi, Tokyo (JP); Norimitsu Kasai, Tokyo (JP); Tomoko Okumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 798 days.

(21) Appl. No.: 09/860,711

(22) Filed: May 21, 2001

(65) Prior Publication Data

US 2001/0048672 A1 Dec. 6, 2001

(30) Foreign Application Priority Data

Jun. 1, 2000 (JP) .............................. 2000-163902

(51) Int. Cl.
*H04B 7/212* (2006.01)
(52) U.S. Cl. ....................... 370/321; 455/12.1
(58) Field of Classification Search ................ 370/321, 370/323, 443, 444, 447, 347, 437, 468, 450, 370/401; 455/12.1, 13.2; 709/217
See application file for complete search history.

(56) References Cited

U.S. PATENT DOCUMENTS

| | | | | |
|---|---|---|---|---|
| 4,995,096 A | * | 2/1991 | Isoe | 455/12.1 |
| 5,420,866 A | * | 5/1995 | Wasilewski | 370/432 |
| 5,537,406 A | * | 7/1996 | Bringer | 370/321 |
| 5,852,721 A | * | 12/1998 | Dillon et al. | 455/428 |
| 5,898,914 A | * | 4/1999 | Yamashita | 370/216 |
| 6,381,228 B1 | * | 4/2002 | Prieto et al. | 370/323 |
| 6,449,267 B1 | * | 9/2002 | Connors | 370/437 |
| 6,813,271 B1 | * | 11/2004 | Cable | 370/486 |

FOREIGN PATENT DOCUMENTS

| | | |
|---|---|---|
| JP | 9-51297 | 2/1997 |
| JP | 10-247872 | 9/1998 |

OTHER PUBLICATIONS

Cacopardi et al, Power Control Techniques Performances Evaluation in the SCPC/DAMA Access Scheme, IEEE, p. 294-300.*

* cited by examiner

*Primary Examiner*—Doris H. To
*Assistant Examiner*—Phuongchau Ba Nguyen
(74) *Attorney, Agent, or Firm*—Oblon, Spivak, McClelland, Maier & Neustadt, P.C.

(57) ABSTRACT

In a satellite communication data delivery method, delivery data is transmitted from a master station to a slave station over a packet exchanging system communication channel 3 via a satellite. The slave station demodulates the packet ID appended to a packet delivered. In case the packet ID is the same as the packet ID owned by the slave station, the slave station receives the data in the packet. The slave station transmits an assignment request signal for the dedicated communication channel 4 over the uplink of the control channels 5. The master station assigns an idle dedicated communication channel out of the dedicated communication channels 4 to the slave station and notifies the slave station of the assignment over the downlink of the control circuits 5. The slave station transmits response data to the master station over the assigned dedicated communication channel.

12 Claims, 8 Drawing Sheets

SATELLITE COMMUNICATION DATA DELIVERY METHOD AND SLAVE AND MASTER STATIONS USING THE METHOD

BACKGROUND OF THE INVENTION

1. Field of the Invention

The present invention relates to a satellite communication data delivery method for performing data delivery from a master station by way of a plurality of slave stations via a satellite, and a slave station and a master station used for the method.

2. Description of the Related Art

Conventionally, communication technologies utilizing satellites have been implemented in satellite broadcasting systems such as so-called BS broadcasts and CS broadcasts and the SNG (Satellite News Gathering) system wherein information from information stations deployed at multiple points is transmitted to the main station, or data delivery systems wherein images or data is delivered in a specific group. One characteristic of the listed satellite communication is that the communication is satellite communication wherein information is transmitted/received between one master station and a plurality of slave stations. For such point-to-multipoint satellite communication, the first concern is how to assign and use the frequency band of communication waves occupied by the system.

FIG. 9 shows a schematic diagram of frequency assignment in a point-to-multipoint satellite communication data delivery system according to the related art. In FIG. 9, 1 represents a large-capacity channel having a wide bandwidth, and 2 a small-capacity channel having a narrow bandwidth. The large-capacity channel 1 is a data delivery channel for transmitting images, voice and data from a master station to slave stations. By extending the bandwidth of the data delivery channel, transmission capacity and transmission rate of information sent from a master station to slave stations are enhanced. The small-capacity channel 2 is provided as many as the number of slave stations N as shown in FIG. 9, and assigned to each slave station. The slave stations transmit response data to the master station over the small-capacity channel 2.

Since the frequency resource is limited, one communication system is typically operated within a frequency band exclusively assigned to the system. Thus, once the bandwidth of the large-capacity channel 1 and the bandwidth of the small-capacity channel 2 are determined, the number of the small-capacity channel 2, that is, the number of slave stations accommodated in the system is determined. To increase the number of slave stations, the bandwidth of the small-capacity channel 2 is made narrower. However, it is necessary to set the minimum bandwidth depending on the performance of communication apparatus used for transmission/reception. Thus the number of the slave stations cannot be increased in excess of a certain number. Even in case the frequency band occupied by a communication system is extended to increase the number of small-capacity channel 2, that is, the number of slave stations, the scale of the receiving system in the master station or repeaters on satellites is inevitably enlarged.

SUMMARY OF THE INVENTION

The invention has been proposed to solve such problems and aims at providing a satellite communication data delivery method whereby the number of slave stations that can transmit response data to a master station can be increased and the apparatus scale of a communication system can be reduced by efficiently utilizing the frequency band, a slave station and a master station using the method.

A satellite communication data delivery method according to a first aspect of the invention is a satellite data delivery method wherein data is delivered from a master station to a plurality of slave stations via a satellite, characterized in that the master station transmits delivery data to slave stations over a packet exchanging system communication channel via a satellite, and the slave stations receive delivery data by having a packet identifier same as that appended to the delivery data and request assignment of dedicated communication channels to the master station over a control channel via a satellite during or on completion of the reception of the data, and transmits response data to the master station over dedicated communication channels assigned to the slave stations.

A satellite communication data delivery method according to a second aspect of the invention is characterized in that the method comprises a data delivery step of delivering data over a packet exchanging system communication channel from a master station to a plurality of slave stations via a satellite, a channel assignment request step, by a slave station that has received delivered data, of requesting assignment of a dedicated communication channel over a control channel via a satellite, a channel assignment step, by the master station, of assigning dedicated communication channels and notifying the slave station of the assignment in response to the channel assignment request in the channel assignment request step, and a response data transmitting step, by a slave station, of transmitting response data corresponding to the data delivered in the data delivery step to the master station, over the dedicated communication channels assigned by the channel assignment request step.

A slave satellite according to a third aspect of the invention is characterized in that the slave satellite comprises a receiver for receiving delivery data transmitted by a master station over a packet exchanging system communication channel via a satellite and a transmitter for transmitting a channel assignment signal and response data corresponding to the delivery data to the master station, and transmits a signal requesting a dedicated communication channel from the transmitter and transmits response data to the master station over the dedicated communication channel assigned by the master station.

A master station according to a fourth aspect of the invention is characterized in that the master station comprises a transceiver for transmitting delivery data to a plurality of slave stations over a packet exchanging system communication channel via a satellite and receiving response data from the slave stations over dedicated communication channels via a satellite and a channel assignment controller for assigning the dedicated communication channel in response to the channel assignment request signal transmitted during or on completion of the reception of delivery data transmitted from the transceiver by the slave station.

A satellite communication data delivery method according to a fifth aspect of the invention is a satellite communication data delivery method according to the first aspect of the invention, characterized in that the master station transmits digital video data to the slave stations over a packet exchanging system communication channel.

A satellite communication data delivery method according to a sixth aspect of the invention is a satellite communication data delivery method according to the first aspect of the invention, characterized in that the slave station transmits response data to notify the master station that the data delivered by the master station has been successfully received.

A satellite communication data delivery method according to a seventh aspect of the invention is a satellite communication data delivery method according to the first aspect of the invention, characterized in that the master station transmits a channel assignment signal for a dedicated communication channel to be assigned to the slave station, to the slave station over a packet exchanging system communication channel.

A slave station according to an eighth aspect of the invention is characterized in that the slave station comprises a receiver for receiving packets transmitted from a master station over a packet exchanging system communication channel via a satellite, a transmitter for transmitting a channel assignment request signal to the master station and response data corresponding to the delivery data from the master station, a data type determination section for determining whether the packets received via the receiver are delivery data or a channel assignment signal, and a channel controller for changing the transmission channel for the transmitter based on a channel assignment signal in case the packets determined by the data type determination section are a channel assignment signal.

DETAILED DESCRIPTION OF THE PREFERRED EMBODIMENTS

Now, a description will be given in more detail of preferred embodiments of the invention with reference to the accompanying drawings.

EMBODIMENT 1

Figure 1:
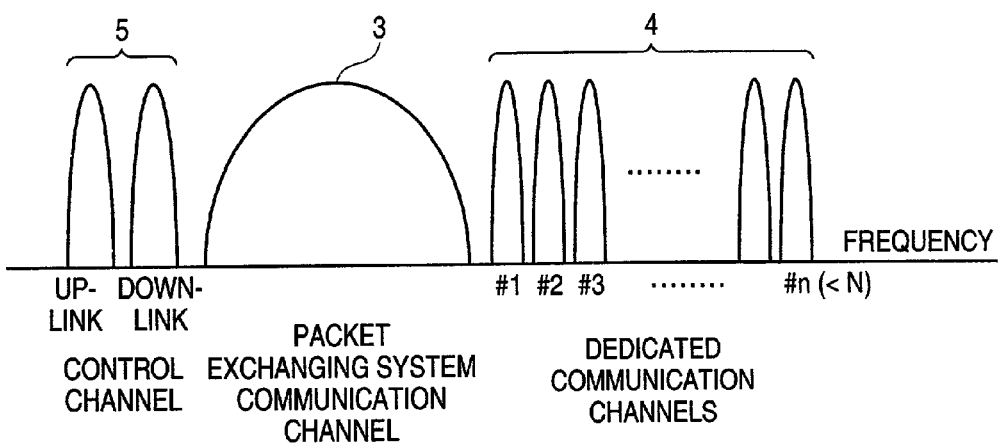
FIG. 1 is a schematic diagram of a communication channel used in a satellite communication data delivery method according to Embodiment 1.
Figure 2:
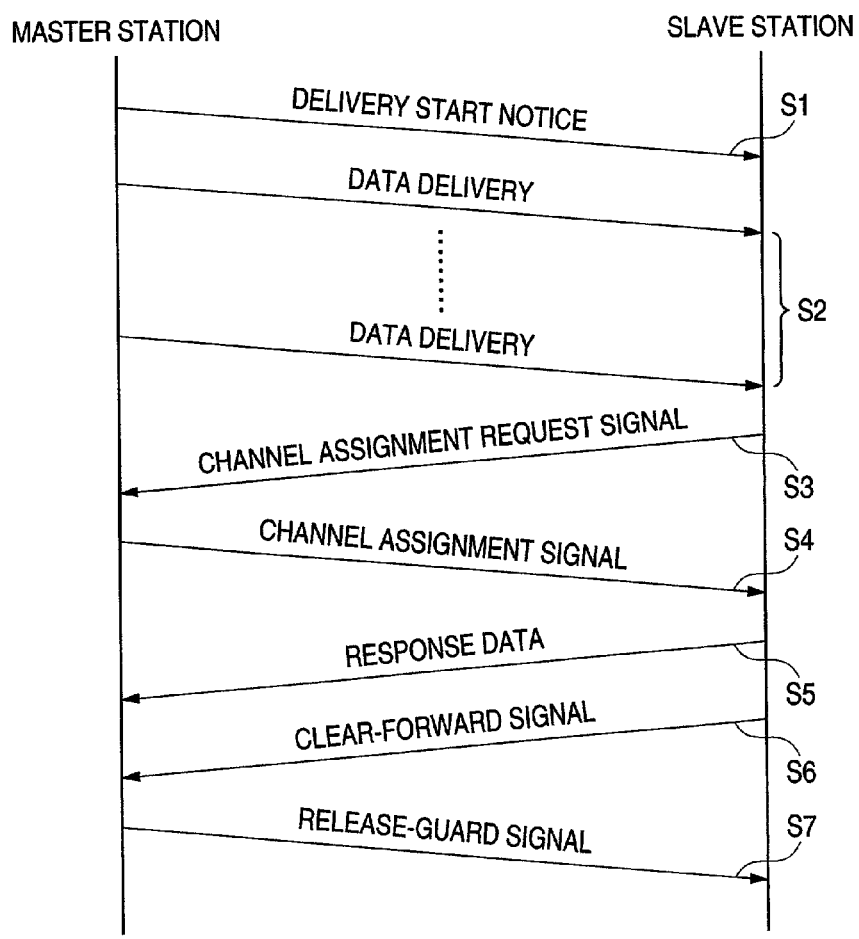
FIG. 2 is a schematic diagram of a communication procedure used in the satellite communication data delivery method according to Embodiment 1.
Figure 3:
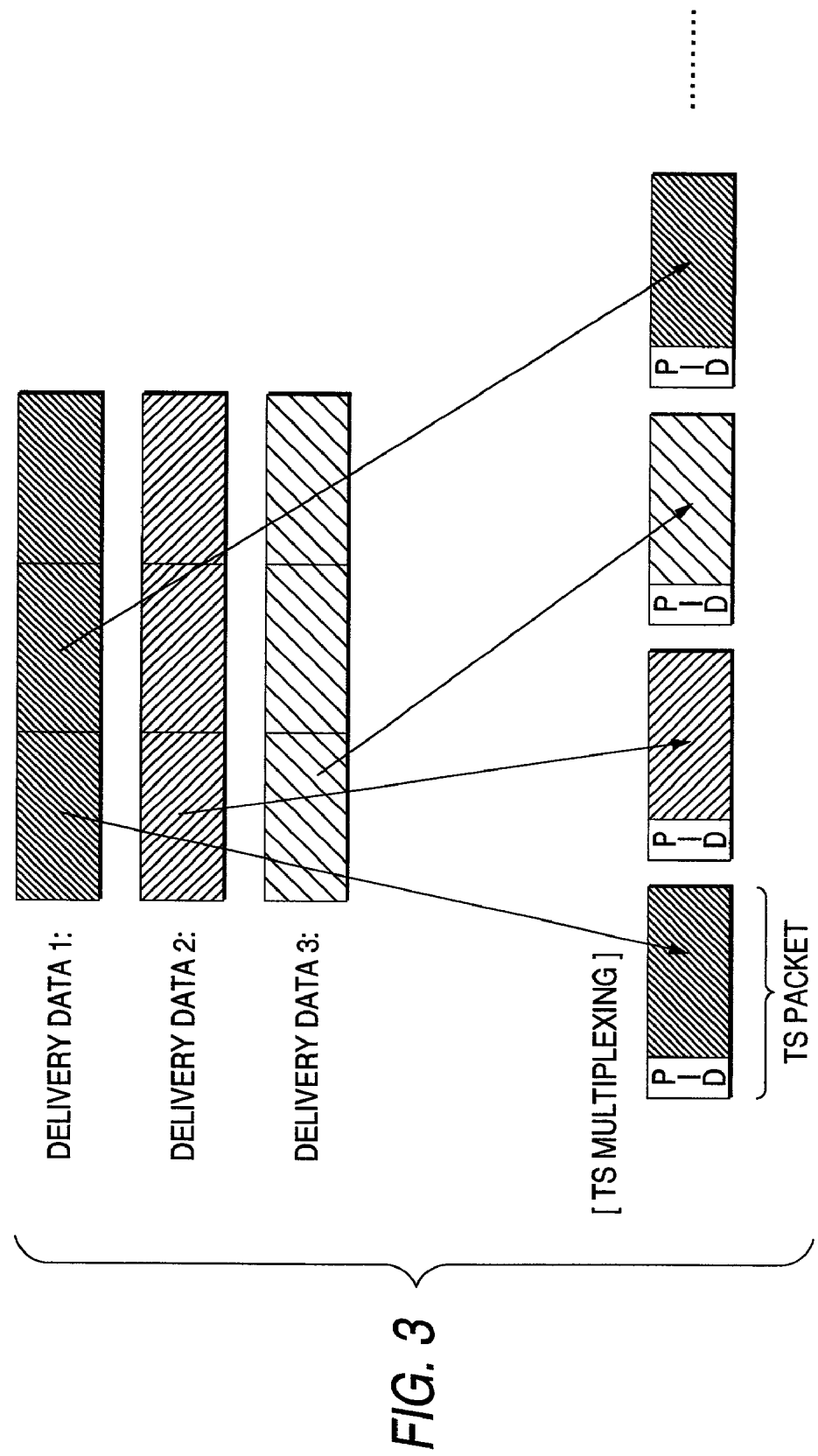
FIG. 3 is a schematic diagram of a delivery data form in the satellite communication data delivery method according to Embodiment 1.
Figure 4:
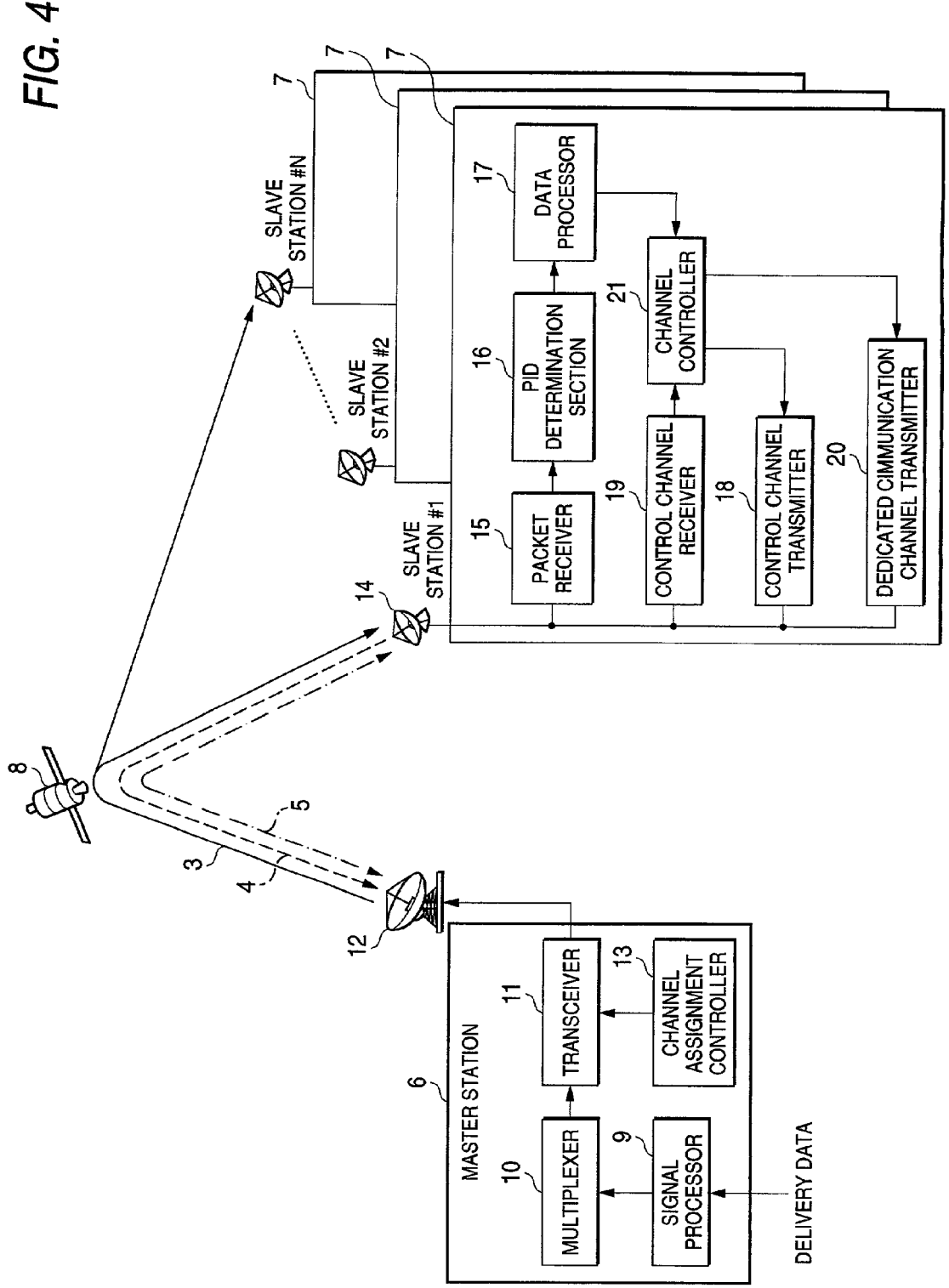
FIG. 4 shows the overall configuration of the apparatus including slave stations and a master station used in the satellite communication data delivery method according to Embodiment 1.

A satellite communication data delivery method and a slave station and a master station using this method according to Embodiment 1 of the invention are described referring to FIGS. 1 through 4. FIG. 1 is a schematic diagram of a communication channel used in a satellite communication data delivery method according to Embodiment 1. FIG. 2 is a schematic diagram of a communication procedure used in the satellite communication data delivery method according to Embodiment 1. FIG. 3 is a schematic diagram of a delivery data form in the satellite communication data delivery method according to Embodiment 1. FIG. 4 shows the overall configuration of the apparatus including slave stations and a master station used in the satellite communication data delivery method according to Embodiment 1.

In a satellite communication data delivery method according to Embodiment 1, the frequency band to be used is assigned as shown in FIG. 1. In FIG. 1, 3 represents a packet exchanging system communication channel. Data is delivered from a master station to slave stations over this channel. 4 represents dedicated communication channels via a satellite for transmitting response data from a slave station to a master station. The dedicated communication channels 4 are composed of channels #1, #2, . . . , #n. The number of channels n is smaller than the number of slave stations N. The dedicated communication channels 4 are assigned by a master station in response to a channel assignment request by slave stations. 5 represents control channels for controlling assignment of dedicated communication channels 5. The control channels consist of an uplink for transmitting a channel assignment request from a slave station to a master station and a downlink for transmitting channel data of the dedicated communication channel 4 assigned by a master station in response to the channel assignment request. A packet exchanging system communication channel 3 (hereinafter referred to simply as "communication channel 3") is requested to deliver volume data from a master station to a slave station at a high speeds and thus has a wide bandwidth. The dedicated communication channel 4 is a channel for transmitting response data having relatively small volume of information when an event has taken place. The channels #1, #2, . . . , #n have narrow bandwidths. The entire frequency bandwidth assigned to a communication system is limited. In case a wide bandwidth is reserved for the communication channel 3 to assure large-capacity, high-speed data delivery, the number of dedicated communication channels may be n, which is smaller than the number of slave stations N. It is clear that, in case data is delivered from a master station to an indefinite number of slave stations, the number of dedicated communication channels n is smaller than the number of slave stations N.

A procedure for performing communication using the communication channel assigned as shown in FIG. 1 will be described referring to FIG. 2. The master station notifies the data delivery start in step S1 before starting data delivery. After notifying data deliver start in step S1, the master station delivers data to a slave station. Steps S1 and S2 are performed by a communication channel 3. Data transmitted in the step S2 comprises a series of data strings divided into packets of a specific length with a packet identifier appended to each packet. The data is transmitted from the master station. The slave station demodulates the packet identifier appended to a packet transmitted and compares the packet identifier with a receivable packet identifier maintained by the slave station to determine whether the packet can be received. In case the packet is receivable, the slave station receives data contained in the packet. The slave station that received data from the master station transmits a signal for requesting assignment of a dedicated communication channel 4 in step 3. The channel assignment request signal is transmitted over the uplink of the control channels 5. In response to the channel assignment request signal, the master station assigns an idle channel out of the dedicated communication channels 4. In step S4, the master station transmits a channel assignment signal to the slave station that has requested channel assignment. Step S4 is performed over the downlink of the control channels 5. In the channel assignment signal is described channel data of the assigned dedicated communication channel. When the dedicated communication channel is assigned, the slave station uses the dedicated communication channel to transmit response data to the master station in step S5. As shown in FIG. 2, response data transmitted by the slave station in step 5 after data delivery in step S2 includes slave station's responses on reception completion notice of delivery data and retransmission request of delivery data. By performing step S3 during data delivery in step S2, the master station can obtain the state of the slave station during data delivery, a request from the slave station, and a variety of responses such as slave station's response to the delivered data. After transmitting response data in step S5, the slave station transmits a clear-forward signal to approve release of the dedicated communication channel over the uplink of the control channels 5 in step S6. The master station, receiving the clear-forward signal, releases the dedicated communication channel assigned to the slave station in step S7 and transmits a release-guard signal to the slave station to indicate that the channel has been released over the downlink of the control channels.

As mentioned above, when a slave station transmits response data to a master station, the dedicated communication channel is released immediately after a dedicated communication channel is assigned and the response data has been transmitted and received. Thus, the dedicated communication channels #1, #2, . . . , #n are assigned to and used by a plurality of slave channels as required thus providing a high use efficiency of communication channels. In case all of the N slave stations receive delivery data simultaneously and request assignment of dedicated communication channels 4 simultaneously, channels are not assigned to some slave stations since the number of dedicated communication channels n is smaller than the number of slave stations N. In this case, transmission/reception of response data between slave stationed assigned dedicated communication channels 4 and the master station completes earlier than data delivery, causing communication channels 4 to be released. Thus, a slave station, even when it cannot be assigned a dedicated communication channel 4, can request assignment of a dedicated communication channel 4 after a randomly generated interval to be assigned an idle dedicated communication channel. Since data delivery is made from a master station to a slave station over a packet exchanging system communication channel, a slave station that does not maintain the same packet identifier as that appended in an incoming packet cannot receive the packet and thus does not participate in data delivery. A configuration where slaves stations not involved in reception of delivery data do not make an request for a dedicated communication channel will render the dedicated communication available to data receiving slave stations alone, thus enhancing the channel use efficiency.

Next, delivery data transmitted from a master station to a slave station over a packet exchanging system communication channel 3 is described. Delivery data includes images, voice and text data. The master station encodes the data and transmits the data in packets. A plurality of delivery data pieces can be multiplexed for delivery from the master station. The packet exchanging system in the DVB (Digital Video Broadcasting) that performs such a delivery system is described referring to FIG. 3. In the DVB, a plurality of delivery data pieces are multiplexed and each delivery data piece is split in units of 184 bytes, mapped to TS (Transport Stream) packet, and transmitted from the master station. Each TS packet is a 188-byte fixed-length packet that consists of a 4-byte header and a 184-byte data section. The header contains a packet identifier (PD). A slave station receives a TS packet having the same packet identifier as that set to a large-capacity high-speed channel receiver (receiver corresponding to the receiving section to received data on the communication channel 3).

Next, the overall configuration of the apparatus used in a satellite communication data delivery method according to Embodiment 1 will be described referring to FIG. 4. In FIG. 4, 6 represents a master station, 7 a plurality of slave stations, and 8 a satellite to relay communication between the master station and the slave stations 7. In the master station 6, 9 represents a signal processor for encoding a variety of delivery data such as images, voice and text data to digital data, 10 a multiplexer for multiplexing the digitally encoded delivery data, 11 a transceiver for modulating, amplifying and outputting the delivery data at high power, and 12 an antenna for transmitting delivery data to the satellite 8. 13 represents a channel controller for controlling assignment of control channels 5 and dedicated communication channels 4 to slave stations. In the slave station 7, 14 represents an antenna for transmitting/receiving radio waves for communicating with the master station 6 via the satellite 8, 15 a packet receiver for receiving packet-based delivery data transmitted by the master station over the communication channel 3, 16 a PID determination section for determining whether the packet identifier of a received delivery packet is the same as the packet identifier owned by the slave station, and 17 a data processor for decoding received delivery data. In the slave station 7, 18 represents a control channel transmitter for transmitting a channel assignment request signal from the slave station 7 to the master station 6 over the control channels 5, 19 a control channel receiver for receiving a channel assignment signal transmitted from the master station 6 to the slave station 7, and 20 a dedicated communication channel transmitter for transmitting slave station's response data over a dedicated communication channel assigned to the slave station 7. The transmitter of the slave station 7 is composed of the control channel receiver 19 and the dedicated communication channel transmitter 20. 21 represents a channel controller for controlling the control channel transmitter 18, the control channel receiver 19, and the dedicated communication channel transmitter 20.

Next, operation of the apparatus shown in FIG. 4 will be described. The master station 6 encodes delivery data such as images, voice, and text data in the signal processor 9 and maps to packets and multiplexes the resulting data in the multiplexer 10. The multiplexed delivery data is modulated, amplified and output at high power, then transmitted to a satellite via the antenna 12. The slave station 7 receives delivery data by the packet exchanging system via the satellite 8 by way of the antenna 14, demodulates the data in the packet receiver 15 and determines whether the packet identifier of a received delivery packet is the same as the packet identifier owned by the slave station in the PID determination section 16. In case these packet identifiers are the same, delivery data is decoded in the data processor 17.

The slave station 7 checks that the packet identifiers are identical via the PID determination section 16. The slave station 7, receiving delivery data, requests channel assignment for transmitting response data from the slave station 7 to the master station 6. This processing is made while delivery data is being received or on completion of reception of delivery data. Thus, based on the receiving state of the data processor 17, a channel assignment request and response data is output from the data processor 17 to the channel controller 21. The control channel transmitter 18, based on an instruction from the channel controller 21, transmits a channel assignment request signal to the master station 6 over the uplink of the control channels 5. The master station, receiving the channel assignment request signal, checks the idle state of the dedicated communication channels 4 in the channel assignment controller 13, and assigns an idle dedicated communication channel 4 to the slave station. The channel assignment controller 13 outputs the channel assignment signal for the assigned dedicated communication channel 4 to the transceiver 11. The channel assignment signal contains a symbol to identify the slave station that has made a channel assignment request, frequency and bandwidth of the assigned dedicated communication channel 4 or channel number of the dedicated communication channel 4. The transceiver 11 transmits a channel assignment signal to the slave station 7 over the downlink of the control channels 5. The slave station receives via the control channel receiver 19 the channel assignment signal transmitted from the master station 6. The channel controller 21 reads information on the dedicated communication channel assigned from the received channel assignment signal and changes the transmission channel of the dedicated communication channel transmitter 20. The dedicated communication channel transmitter 20 receives response data from the channel controller 21 and transmits the data to the master station 6.

Transmission of response data from the slave station 7 to the master station 6 is followed by release of the assigned dedicated communication channel 4. The channel controller 21, after the response data is transmitted from the dedicated communication channel transmitter 20, instructs the control channel transmitter 18 to transmit a clear-forward signal to approve release of the dedicated communication channel 4. The control channel transmitter 18 transmits a clear-forward signal over the uplink of the control channels 5. The master station 6, receiving the clear-forward signal, changes the status of the dedicated communication channel corresponding to the clear-forward signal to idle. After releasing the dedicated communication channel, the master station 6 transmits a release-guard signal to the slave station 7. The slave station 7, receiving a release-guard signal from the master station, performs post-processing such as halting transmission feature in the control channel transmitter 18 and dedicated communication channel transmitter 20.

EMBODIMENT 2

Figure 5:
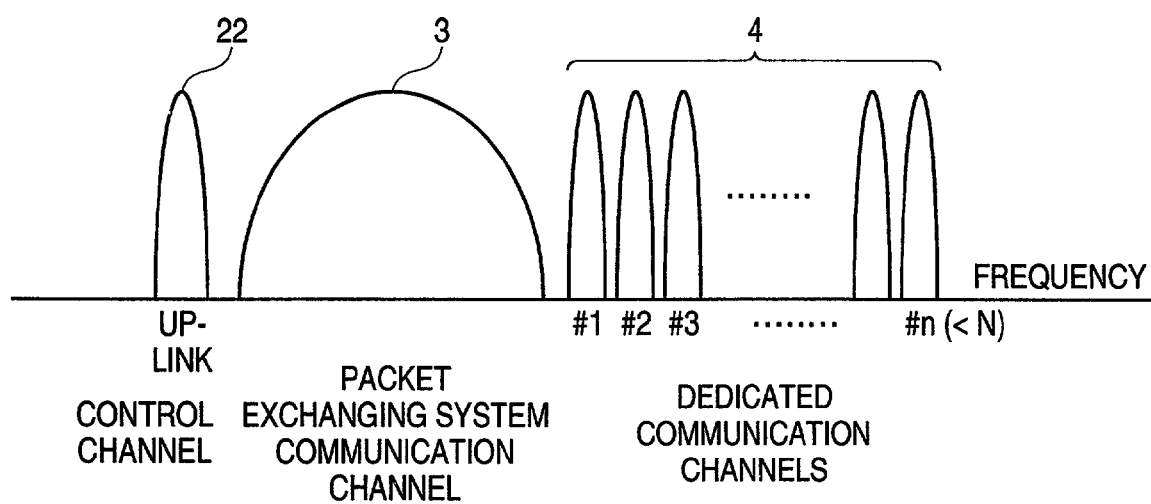
FIG. 5 is a schematic diagram of a communication channel used in a satellite communication data delivery method according to Embodiment 2.
Figure 6:
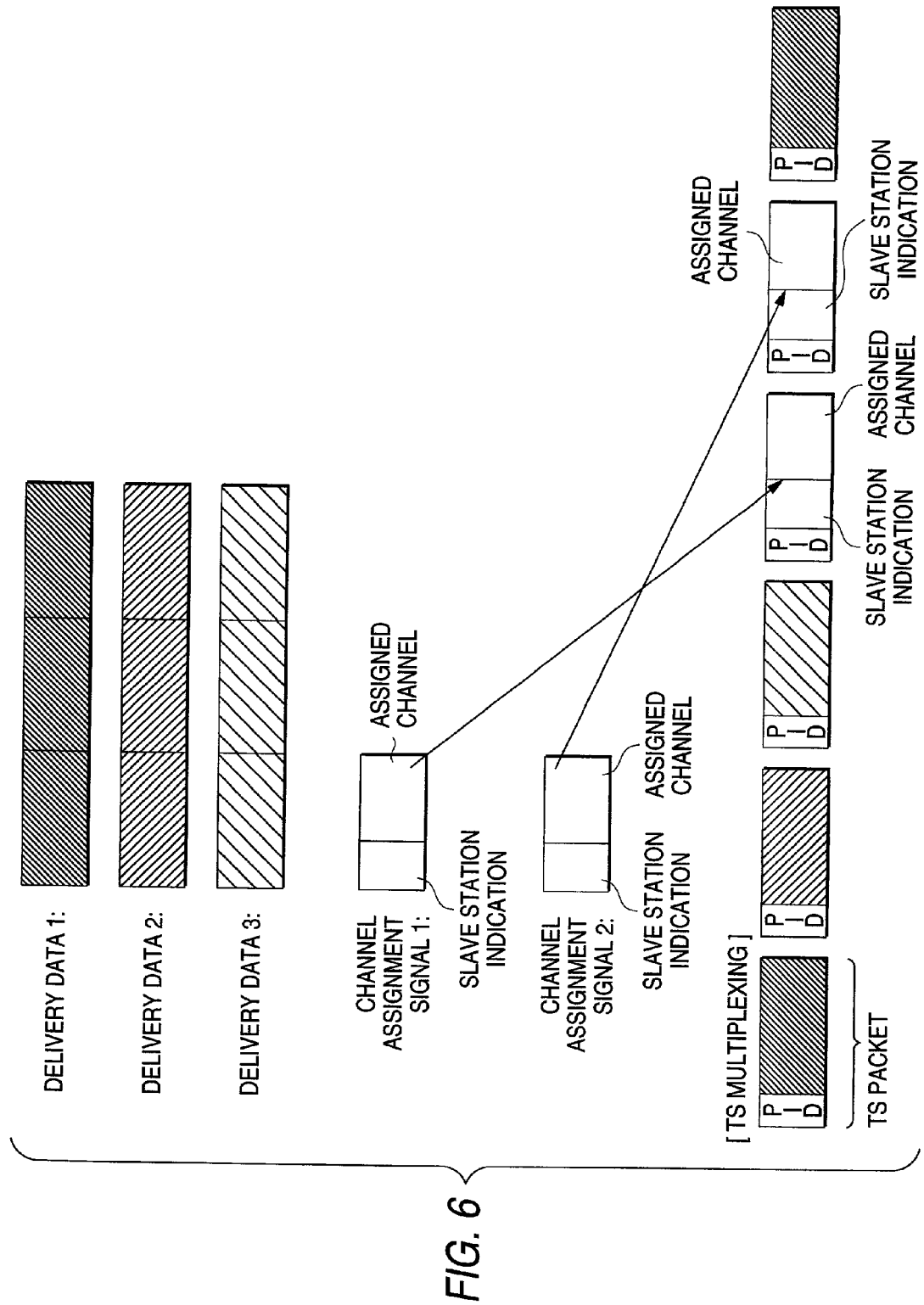
FIG. 6 is a schematic diagram of a delivery data form in the satellite communication data delivery method according to Embodiment 2.
Figure 7:
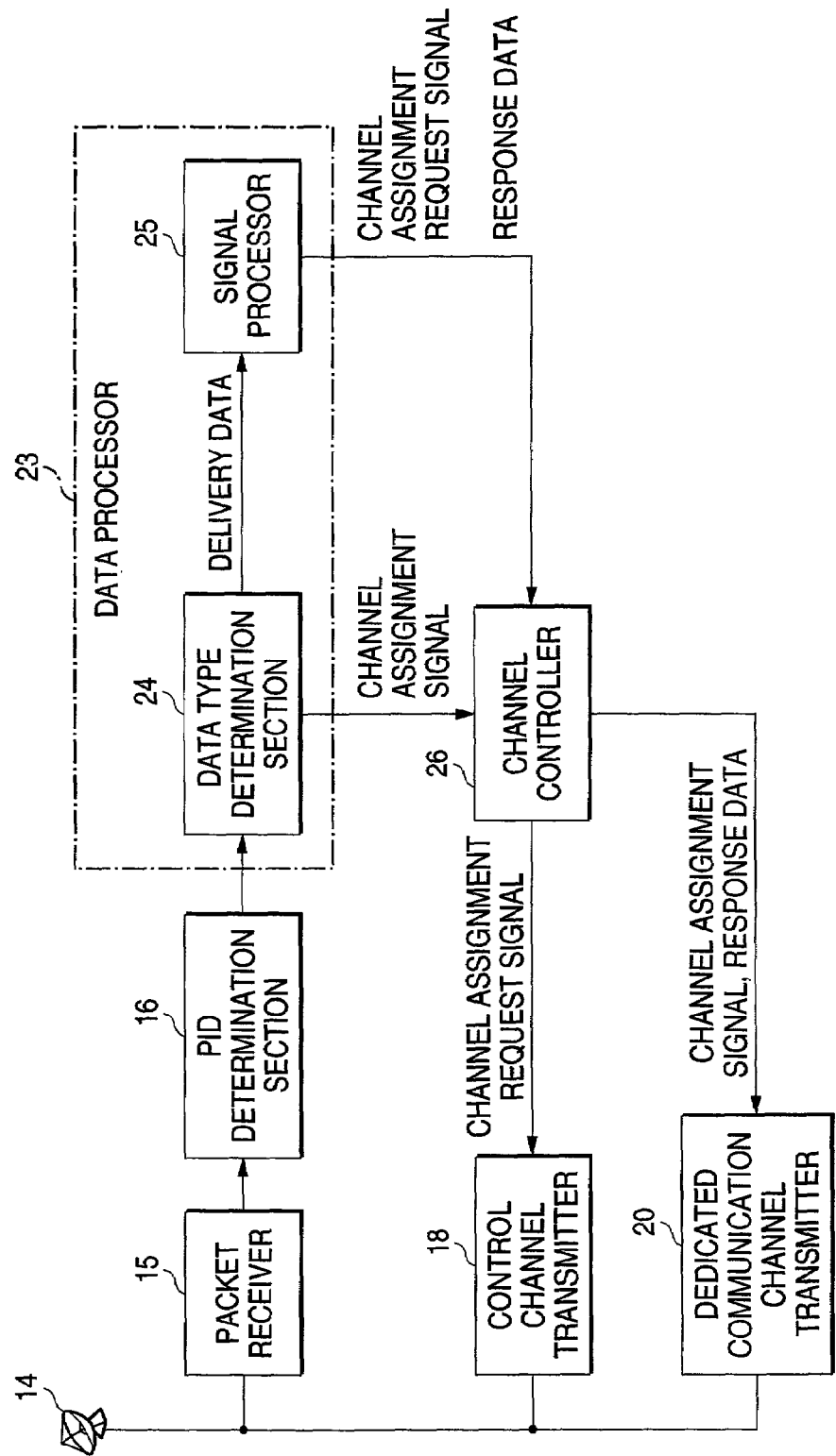
FIG. 7 shows the configuration of a slave station used in the satellite communication data delivery method according to Embodiment 2.
Figure 8:
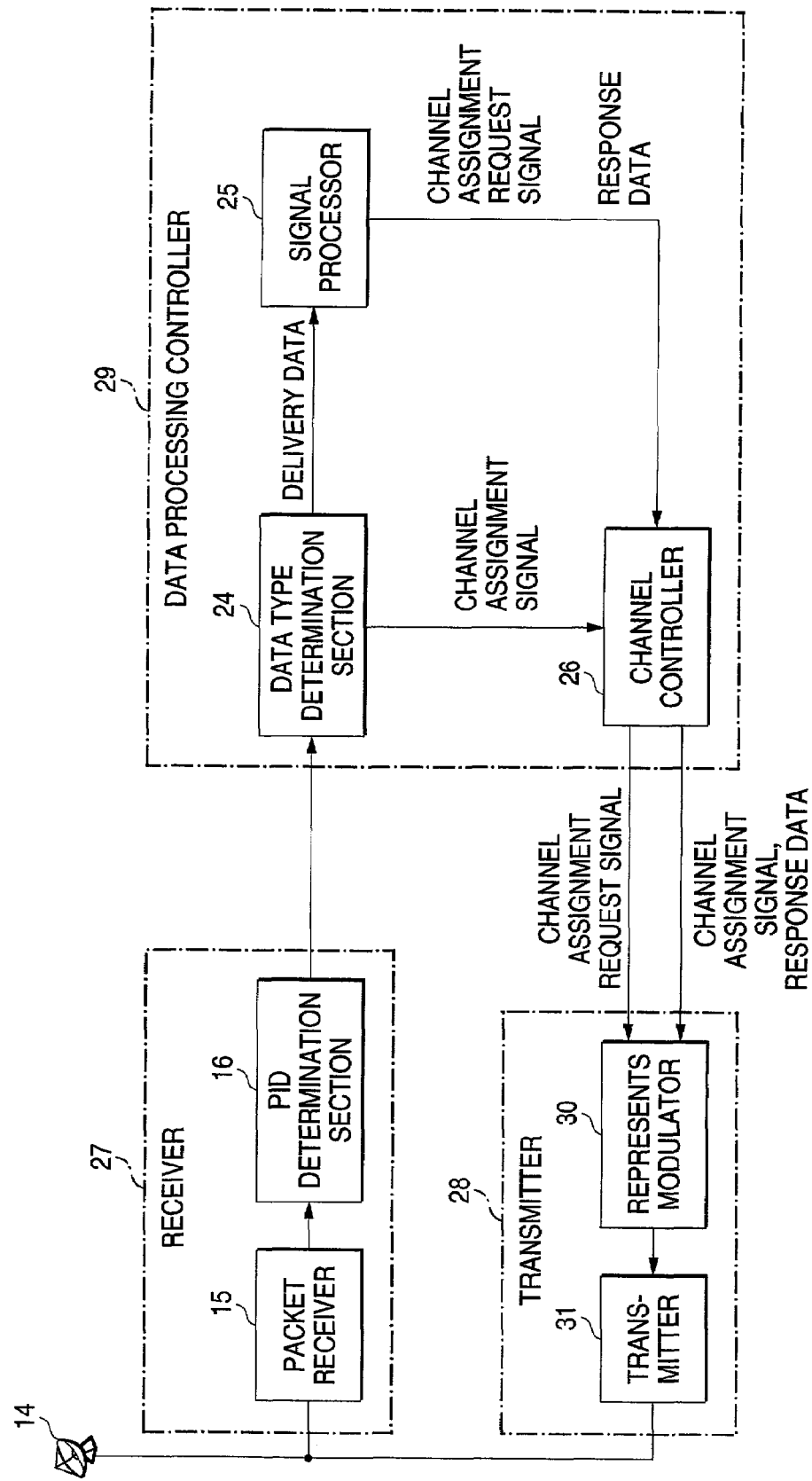
FIG. 8 shows the hardware configuration of a slave station used in the satellite communication data delivery method according to Embodiment 2.
Figure 9:
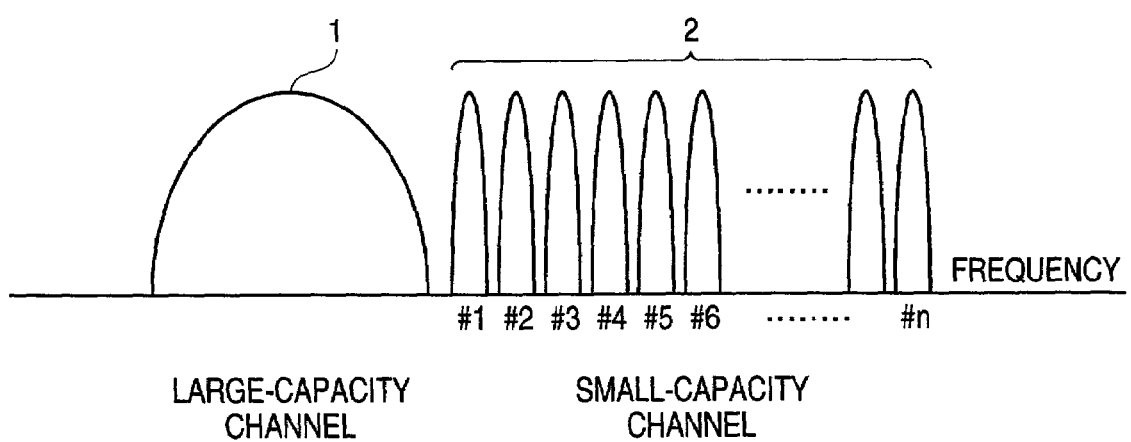
FIG. 9 shows a schematic diagram of frequency assignment in a point-to-multipoint satellite communication data delivery system according to the related art.

A satellite communication data delivery method and a slave station and a master station using this method according to Embodiment 2 of the invention are described referring to FIGS. 5 through 8. FIG. 5 is a schematic diagram of a communication channel used in a satellite communication data delivery method according to Embodiment 2. FIG. 6 is a schematic diagram of a delivery data form in the satellite communication data delivery method according to Embodiment 2. FIG. 7 shows the configuration of a slave station used in the satellite communication data delivery method according to Embodiment 2. FIG. 8 shows the hardware configuration of a slave station used in the satellite communication data delivery method according to Embodiment 2.

In a satellite communication data delivery method according to Embodiment 2, the frequency band to be used is assigned as shown in FIG. 5. In FIG. 5, 22 represents a control channel for transmitting a channel assignment request from a slave station to a master station and configured by an uplink from a slave station to a master station alone. In FIG. 5, channels assigned the same signs as in FIG. 1 represent the same channels or same portion thereof in FIG. 1 according to Embodiment 1.

Channel assignment by the control channels 22 characteristic in FIG. 5 is described. Since an uplink is provided in the control channels 22, a slave station to receive delivery data transmits a channel assignment request signal over the uplink of the control channels 22 to the master station. The master station, in response to the channel assignment request signal, assigns an idle channel to the slave station out of the dedicated communication channels. The master station transmits a channel assignment signal to the slave station that has requested channel assignment.

In Embodiment 2, the communication channel 3 is used to transmit the channel assignment signal from the master station to the slave station. As shown in FIG. 6, a channel assignment signal 1 and a channel assignment signal 2 have slave station indication and information on the assigned channel respectively. Such information is mapped as a packet together with delivery data. The packet identifier of the channel assignment signal can be separate from the packet identifier of delivery data so that the channel assignment signal maybe discriminated from delivery data. For example, in case the packet identifier #01 is appended to delivery data and #20 to the channel assignment signal, a plurality of slave stations having the packet identifier #01 receives delivery data. In a configuration where the packet identifier #20 can be received by all the slave stations, the channel assignment signal is received by all the slave stations, of which the slave stations with slave station indication matched obtain information on assigned channels and use the assigned dedicated communication channels. Slave station indication contained in the channel assignment signal indicates a specific slave station where a dedicated communication channel is to be assigned. Information on the assigned channel includes the channel number of the dedicated communication channel to be assigned and, at a lower level, the frequency and bandwidth.

When a dedicated communication channel 4 is assigned to a slave station, the slave station transmits response data to the master station over the dedicated communication channel 4 and transmits a clear-forward signal to the master station over the control channel 22. Transmission of response data and the clear-forward signal is made the same as Embodiment 1. The master station that has received the clear-forward signal releases the dedicated communication channel assigned to the slave station and transmits a release-guard signal to the slave station to indicate that the channel has been released over the communication channel 3. While FIG. 6 does not specify multiplexing of the packets carried on the release-guard signal, the process is the same as that for the channel assignment signal. That is, packets of the release-guard signal containing slave station indication to identify the target slave station and notifying release of the dedicated communication channel are provided with packet identifiers in the header and mapped to multiplexed strings.

Thus, according to Embodiment 2, a channel assignment signal and a release-guard signal are transmitted from the master station to a slave station over the communication channel 3 and the control channel 22 is composed of an uplink alone. Via this configuration, it is possible to reduce the frequency band for control.

Next, configuration and operation of a slave station according to Embodiment 2 will be described. FIG. 7 shows the configuration of a slave station used in the satellite communication data delivery method according to Embodiment 2. In FIG. 7, 23 represents a data processor for processing delivery data received over the communication channel 3, a channel assignment request signal and a release-guard signal. In the data processor 23, 24 represents a data type determination section for determining whether the received data is the delivery data, a channel assignment request signal or a release-guard signal, and 25 a signal processor for decoding delivery data. 26 represents a channel controller for controlling the control channel transmitter 18 and the dedicated communication channel transmitter 20. In FIG. 7, circuits assigned the same signs as in FIG. 4 represent the same or equivalent portion in FIG. 4 according to Embodiment 1.

The slave station 7 receives delivery data by the packet exchanging system via the satellite 8 by way of the antenna 14, demodulates the data in the packet receiver 15 and determines whether the packet identifier of a received delivery packet is the same as the packet identifier owned by the slave station in the PID determination section 16. The slave station determines whether the received data is the delivery data, a channel assignment signal or a release-guard signal in the data type determination section. This determination is made using for example a packet identifier appended to a packet. In case the received data is determined as the delivery data, the slave station outputs the delivery data to the signal processor 25, which decodes the delivery data. In case the received data is determined as a channel assignment signal, the slave station outputs a channel assignment signal to the channel controller 26 provided the slave station indication is of its own. The channel controller 26 outputs the channel assignment signal and response data to the dedicated communication channel controller. The signal processor 25 outputs a channel assignment request signal for transmitting response data from the slave station to the master station during reception of delivery data or on completion of reception of delivery data, together with response data. The channel controller 26, receiving the channel assignment request signal, performs the same processing as that in Embodiment 1 on the control channel transmitter 18. The channel controller 26 performs the same processing on transmission of a clear-forward signal after transmission of response data as that in Embodiment 1.

FIG. 8 shows the hardware configuration of a slave station used in the satellite communication data delivery method according to Embodiment 2. In FIG. 8, 27 represents a receiver including a packet receiver 15 and a PID determination section 16, 28 a transmitter, and 29 a data processing controller. In the slave station, the data processing controller 29 is manufactured as a main unit while the receiver 27 and the transmitter 28 are manufactured as card modules. By inserting the receiver 27 and the transmitter 28 manufactured as card modules into the data processing controller 29 manufactured as a main unit, the overall configuration of the slave station apparatus is complete. In the transmitter 28, 30 represents a modulator and 31 a transmitter. In FIG. 8, circuits assigned the same signs as in FIG. 7 represent the same or equivalent portion in FIG. 7.

Thus, by manufacturing the data processing controller 29 as a main unit and the receiver 27 and the transmitter 28 as card modules, it is possible to configure hardware by feature of the slave station apparatus. This simplifies the interfaces and upgrades maintainability. For a slave station according to Embodiment 2, the control channel receiver 19 provided in a slave station in Embodiment 1 is not required. Thus it is not necessary to provide a dedicated module for the control channel receiver 19.

The modulator 30 switches to the control channel 5 for modulation in case it transmits a channel assignment request signal over the control channel 5. The modulator 30 switches to the dedicated communication channel 4 for modulation in case it transmits response data over the dedicated communication channel 4. Whether the modulator 30 transmits a channel assignment request signal or response data is instructed by the circuit controller 26. The transmitter performs high-frequency conversion and amplifies and outputs the delivery data at high power as required in transmitting a channel assignment request signal or response data.

According to the first to sixth aspects of the invention, delivery data is transmitted from a master station to a slave station over a packet exchanging system communication channel, and response data is transmitted from the slave station to the master station over a dedicated communication channels assigned as required by the master station in response to a channel assignment request transmitted by the slave station that has received delivery data. It is not necessary to constantly provide all the slave station with the dedicated communication channels, so that it suffices to provide a smaller number of dedicated communication channels than the number of the slave station in a system, thereby assuring efficient use of the frequency bandwidth.

According to the seventh and eighth aspects of the invention, a channel assignment signal is transmitted from a master station to a slave station over a packet exchanging system communication channel. This makes it unnecessary to provide a control downlink from the master station to the slave station, thereby assuring efficient use of the frequency bandwidth and simplifying the receiver of the slave station.

What is claimed is:

1. A satellite communication data delivery method in which data is delivered from a master station to a plurality of slave stations via a satellite, the method comprising:

at the master station, transmitting delivery data with an appended packet identifier to all of the plurality of the slave stations over a packet exchanging system communication channel via the satellite;

at the slave stations, receiving the delivery data, and requesting by at least one designated slave station having a same packet identifier as that appended to the delivery data over an uplink control channel via the satellite assignment of a dedicated communication channel during or on completion of the receiving of the delivery data;

at the master station, transmitting to the at least one designated slave station information of assignment of the dedicated communication channel, wherein the transmitted information of assignment of the dedicated communication channel is via the packet exchanging system communication channel; and at the at least one designated slave station, transmitting response data to the master station over the dedicated communication channel assigned to the designated slave station.

2. A satellite communication data delivery method according to claim 1, wherein the transmitted information of assignment of the dedicated communication channel is via a downlink control channel.

3. A satellite communication data delivery method according to claim 1, wherein the master station transmits digital video data to the slave stations over the packet exchanging system communication channel.

4. A satellite communication data delivery method according to claim 1, wherein the slave station transmits response data to notify the master station that the data delivered by the master station has been successfully received.

5. A satellite communication data delivery method, comprising:
   delivering data with an appended packet identifier over a packet exchanging system communication channel from a master station to a plurality of slave stations via a satellite;
   requesting assignment from the master station of a dedicated communication channel over an uplink control channel via the satellite by at least one designated slave station of the plurality of slave stations having a same packet identifier as that appended to the delivery data that have received the delivered data;
   assigning, by the master station, a dedicated communication channel and notifying the at least one designated slave station of the assignment in response to the requesting, wherein the notified assignment of the dedicated communication channel is via the packet exchanging system communication channel; and
   transmitting, by the at least one designated slave station, response data corresponding to the data delivered in the delivering to the master station, over the dedicated communication channel assigned by the requesting.

6. A satellite communication data delivery method according to claim 5, wherein the transmitted information of assignment of the dedicated communication channel is via a downlink control channel.

7. A slave station, comprising:
   a receiver configured to receive delivery data with an appended packet identifier transmitted by a master station over a packet exchanging system communication channel via a satellite; and
   a transmitter having a same packet identifier as that appended to the delivery data configured to transmit to the master station a signal over an uplink control channel requesting a dedicated communication channel,
   wherein the receiver is further configured to receive a designation of a dedicated communication channel from the master station, wherein received information of designation of the dedicated communication channel is via the packet exchanging system communication channel, and
   wherein the transmitter is further configured to transmit response data to the master station over the dedicated communication channel assigned by the master station.

8. A slave station according to claim 7, wherein the transmitted information of assignment of the dedicated communication channel is via a downlink control channel.

9. A master station, comprising:
   a transceiver configured to transmit delivery data with an appended packet identifier to a plurality of slave stations over a packet exchanging system communication channel via a satellite and to receive, after transmitting the appended packet identifier, a channel assignment request from at least one designated slave station, having a same packet identifier as that appended the delivery data which corresponds to the transmitted packet identifier, over an uplink control channel via the satellite;
   a channel assignment controller configured to assign a dedicated communication channel in response to the channel assignment request signal transmitted during or on completion of reception of the delivery data transmitted from the transceiver by the at least one slave station, wherein transmitted information of assignment of the dedicated communication channel is via the packet exchanging system communication channel; and
   the transceiver further receiving response data from the at least one designated slave station over the dedicated communication channel.

10. A master station according to claim 9, wherein the transmitted information of assignment of the dedicated communication channel is via a downlink control channel.

11. A slave station, comprising:
   a receiver configured to receive packets with an appended packet identifier transmitted from a master station over a packet exchanging system communication channel via a satellite;
   a transmitter having a same packet identifier as that appended the delivery data configured to transmit a channel assignment request signal to the master station over an uplink control channel and to transmit response data corresponding to delivery data from the master station;
   a data type determination section configured to determine whether the packets received via the receiver are delivery data or a channel assignment signal; and
   a channel controller configured to change the transmission channel for the transmitter to transmit the response data based on a channel assignment signal in case the packets determined by the data type determination section are a channel assignment signal, wherein transmitted information of assignment of the dedicated communication channel is via the packet exchanging system communication channel.

12. A slave station according to claim 11, wherein the transmitted information of assignment of the dedicated communication channel is via a downlink control channel.

* * * * *